United States Patent
Vasishta

(10) Patent No.: US 10,157,411 B1
(45) Date of Patent: Dec. 18, 2018

(54) RECOMMENDATION SYSTEM THAT RELIES ON RFM SEGMENTATION

(71) Applicant: Amazon Technologies, Inc., Reno, NV (US)

(72) Inventor: Ananth Balakrishna Vasishta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1043 days.

(21) Appl. No.: 14/209,817

(22) Filed: Mar. 13, 2014

(51) Int. Cl.
*G06Q 30/06* (2012.01)

(52) U.S. Cl.
CPC .............................. *G06Q 30/0631* (2013.01)

(58) Field of Classification Search
CPC ..... G06Q 30/0631; G06Q 30/02; G06Q 30/00
USPC .......... 705/26.7, 26.1, 14.66, 7.38; 715/733; 726/1; 455/414.1
See application file for complete search history.

(56) References Cited

U.S. PATENT DOCUMENTS

| | | | |
|---|---|---|---|
| 7,328,216 B2 | 2/2008 | Hofmann et al. | |
| 7,685,074 B2 * | 3/2010 | Linden ................ | G06Q 30/02 705/26.7 |
| 8,200,527 B1 * | 6/2012 | Thompson ......... | G06Q 10/0639 705/7.38 |
| 8,478,664 B1 * | 7/2013 | Xavier ................ | G06Q 30/00 705/26.1 |
| 8,484,099 B1 | 7/2013 | Pope et al. | |
| 8,504,408 B2 | 8/2013 | Banthia et al. | |
| 8,600,804 B2 | 12/2013 | Ramchandani et al. | |
| 2005/0071251 A1 | 3/2005 | Linden et al. | |
| 2007/0061303 A1 * | 3/2007 | Ramer ................ | G06F 17/30864 |
| 2007/0094066 A1 * | 4/2007 | Kumar ................ | G06Q 10/04 706/61 |
| 2008/0015936 A1 | 1/2008 | Bibelnieks et al. | |
| 2008/0243817 A1 | 10/2008 | Chan et al. | |
| 2008/0250026 A1 * | 10/2008 | Linden ............... | G06F 17/30867 |
| 2009/0163183 A1 * | 6/2009 | O'Donoghue ....... | G06Q 30/02 455/414.1 |
| 2009/0172551 A1 * | 7/2009 | Kane .................. | G06Q 30/02 715/733 |
| 2009/0254971 A1 * | 10/2009 | Herz .................. | G06Q 10/10 726/1 |
| 2011/0055000 A1 | 3/2011 | Zhang et al. | |
| 2011/0258049 A1 * | 10/2011 | Ramer ............... | G06F 17/30867 705/14.66 |

\* cited by examiner

*Primary Examiner* — Vanel Frenel
(74) *Attorney, Agent, or Firm* — Knobbe, Martens, Olson & Bear, LLP

(57) ABSTRACT

A recommendation system divides users into a plurality of segments based on scores generated for each of a plurality of users of an electronic service that provides functionality for users to browse and purchase or select items. The scores can be RFM (Recency, Frequency, and Monetary amount) scores based on at least purchase or selection recency, purchase or selection frequency, and in some instances, the monetary amount spent. The recommendation system can further detect behavior-based correlations between particular segments and particular items and/or item attributes. The correlations can be based on purchase or selection histories of the users assigned to specific segments. The recommendation system can select items to recommend to particular users based at least partly on the detected behavior-based correlations.

9 Claims, 4 Drawing Sheets

RECOMMENDATION SYSTEM THAT RELIES ON RFM SEGMENTATION

BACKGROUND

Description of the Related Art

A recommendation service is a computer-implemented service that recommends items to users from a database of items. The recommendations are often customized to particular users based on information known about the users. One common application for recommendation services involves recommending products to users of web sites and other interactive systems. For example, shopping sites commonly provide services for recommending catalog items to customers based on item viewing histories, purchase histories, item ratings, and/or other monitored customer behaviors.

Some recommendation systems identify items that are related to one another based on the monitored behaviors of users. See, e.g., U.S. Pat. No. 7,685,074. The item relationships are determined by analyzing user purchase histories, product viewing histories, and/or other types of recorded behavioral data reflecting users' interests in particular items. This process may be repeated periodically (e.g., once per day or once per week) to incorporate the latest browsing activities of users. The resulting item-to-item association mappings may be used to provide item recommendations to users in various contexts. For example, the item-to-item mappings may be used to supplement product detail pages of an electronic catalog with lists of related items, and/or may be used to generate personalized recommendations for particular users.

DETAILED DESCRIPTION

Figure 1:
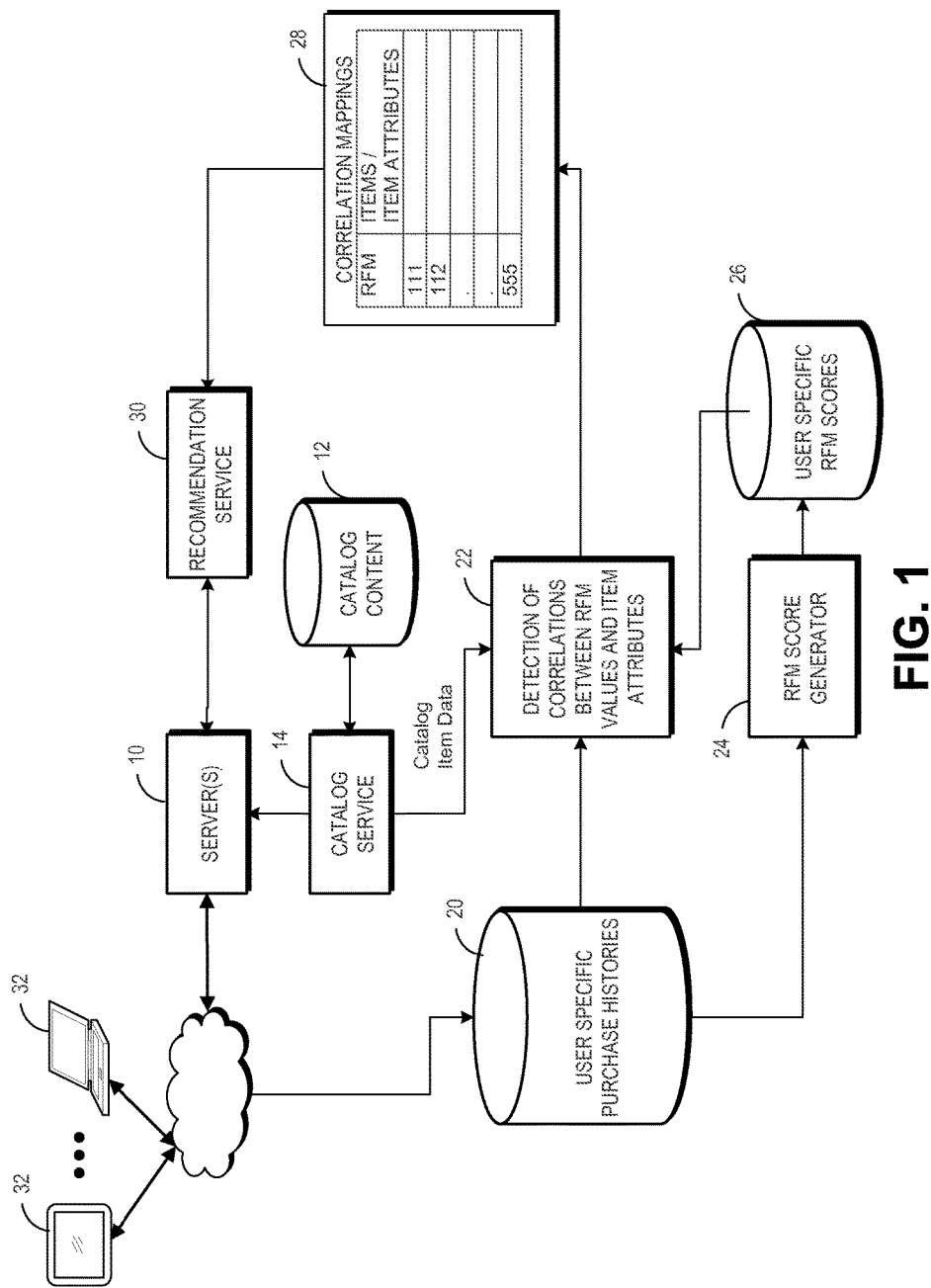
FIG. 1 illustrates an electronic commerce system that includes components for generating and using RFM scores.

Various embodiments will be described hereinafter with reference to the accompanying drawings. These embodiments are illustrated and described by example only, and are not intended to be limiting. Thus, nothing in this detailed description is intended to imply that any particular feature, component or characteristic is essential to the invention.

I. Introduction

Recommendation services of the type described above may sometimes generate low utility or "poor quality" recommendations. For example, suppose a user who purchases only items under $10 from a shopping site will most likely not be interested in high end electronics items worth more than $500. If this user buys a HDMI cable for $5, some of the existing recommendation services might recommend a television (based on the high frequency with which HDMI cables and televisions are purchased in combination). But, it is unlikely that this user will purchase the television. Thus, a general item-to-item mapping may not work in this instance. Poor quality recommendations can also result from a failure of the recommendation system to adequately consider the user's purchase frequency and recency.

These problems are addressed in some embodiments by incorporating RFM scores into the recommendation process. RFM scores are generated for specific users based on their shopping behaviors. These scores (possibly in combination with other scores or factors) are used to divide the user population into segments, where each segment may, for example consist of users with like RFM scores. A correlation analysis is then performed to discover correlations between particular RFM scores and particular catalog items and/or catalog item attributes. For example, the correlation analysis may reveal that users with a particular RFM score or score set have a relatively unique interest (or lack of interest) in a particular class or category of catalog items. These detected correlations are then used in one or more ways to improve the recommendation process; for example, negative correlations may be used to filter out, or lower the rankings of, recommendations likely to be poor. Positive correlations may be used to generate new recommendations, or to boost the rankings of selected recommendations.

RFM scores generally indicates the following principle: that users who purchase frequently are more likely to buy again versus users who have made just one or two purchases; users who have spent the most money are more likely to buy again; the most valuable customers tend to continue to become even more valuable. In some embodiments, the recommendation service can also take into account a user's tenure with the shopping site as an additional category for scoring a user. The recommendation service can also take into account ratings as one of the item attributes that are correlated. In yet other embodiments, only one or two of the RFM categories may be used to score a user. In an embodiment, the user's trailing two year (24 months) history can be used to calculate the scores.

The recency score can relate to how long it has been since a user's last non-canceled purchase. In an embodiment, the recency is segmented into five divisions. The first division can include users who made the last purchase within the last one month. The second division can include users who made their last purchase one month ago, but within the last three months. The third division can include users who made their last purchase more than three months ago, but within the last six months. The fourth division can include users who made their last purchase more than six months ago, but within the last year. The fifth division can include users who made their last purchase more than a year ago. Each of the divisions can be assigned a score as follows: first division: 5, second division: 4, third division: 3, fourth division: 2 and fifth division: 1. Thus, the first division users who have purchased an item most recently can be awarded the highest score in the recency category. The recency segments can be altered and dynamically recalculated at any moment.

The frequency score can relate to how often the user purchases items from the shopping site. The frequency score can be based on the number of distinct purchase days during the trailing 24 months. For example, the frequency score can be assigned as follows: less than 5 purchase days: 1, between 5 to 15 purchase days: 2, between 16 to 30 purchase days: 3, between 31 to 60 purchase days: 4, more than 60 purchase days: 5. The frequency segments can be altered and dynamically recalculated at any moment. In some instances, a significant number of users of the site may make only a single purchase. In that case, it may be better to assign a score of 1 to all the users with one purchase and then divide the remaining frequencies evenly among the four segments.

The monetary score can relate to the purchase amount of the items bought by a user in the last 24 months. For example, the monetary score can be assigned as follows: less than $50: 1, $50 and more but less than $100: 2, $100 and more but less than $200: 3, $200 and more but less than $400: 4, and $500 and more: 5. The monetary segments can be altered and dynamically recalculated at any moment.

In the illustrated embodiments, each RFM score is thus a set of three individual scores (R, F and M) on a scale of 1 to 5. For example, an RFM score of 1-2-3 (which may alternatively be written as "123") represents the following score set: R=1, F=2, M=3. In other embodiments, different scales or scoring methods may be used. The RFM score can also be combined into a single number. For example, a single number can be obtained by multiplying the recency score, frequency score, and the monetary score by 100, 10, and 1, respectively and adding them all together (e.g. 5*100+ 1*10+1=511). The RFM scores can reveal important behavior patterns for the users. For instance, the RFM score of 555 may correspond to highly valuable users who shopped recently, have bought regularly, and spend lots of money. The RFM score of 51×, 41× may indicate new users. The RFM score of 135 may indicate users who used to visit the shopping site often and spent big, but haven't shopped for a while. The RFM score of 111, 112 may refer to users who purchased an item a while ago and have not spent much since then. Finally, the RFM score of 155, 255, 145, 245, 154, and 254 may indicate high valued users who have stopped coming back. Furthermore, associating the RFM scores with items, as described more in detail below, can improve the recommendation service.

II. Example RFM Recommendation Service System

FIG. 1 illustrates examples of how the features described herein may be implemented in the context of an interactive e-commerce system or site that hosts an electronic catalog of items that are available for purchase. The system may, for example be accessible via a web site, a specialized mobile application, an interactive television system, and/or other types of systems that provide interactive browse functionality. As illustrated in FIG. 1, the system includes one or more physical servers 10 that provide user access to an electronic catalog of items represented in a database or collection of databases 12. The catalog items may include or consist of items that can be purchased via the system (e.g., consumer electronics products, household appliances, apparel items, sporting goods, software products, digital content items, etc.). The database 12 may also store data regarding how the items are arranged within categories or browse nodes of a hierarchical browse structure, as is known in the art. Data regarding the catalog items and the browse structure is accessible via a catalog service 14 that provides access to descriptions of the various items available for purchase. As is conventional, the electronic catalog may include a distinct item detail page (also called a "product detail page") for each item that can be purchased.

Users access the system via a network, such as the Internet, from their respective user computing devices 32 (PCs, smartphones, tablets, set-top boxes, etc.), typically using a browser or a specialized shopping application. As users browse and make purchases of items represented in the electronic catalog, the system records one or more types of item selection events in a data repository 20, which may include multiple distinct log files and/or databases. The events may include, for example, item purchase events, item viewing events (which may be based on visits to item detail pages), shopping cart add events, wish list add events, and other types of user-directed events that evidence users' interests in particular catalog items. The events may, but need not, be stored as session records that correspond to respective browsing sessions and users. In some embodiments, the event histories of users are maintained anonymously for purposes of subsequent analysis; for example, the cart-add events may be recorded in association with anonymous session identifiers, and not in association with specific users or user accounts.

Figure 2:
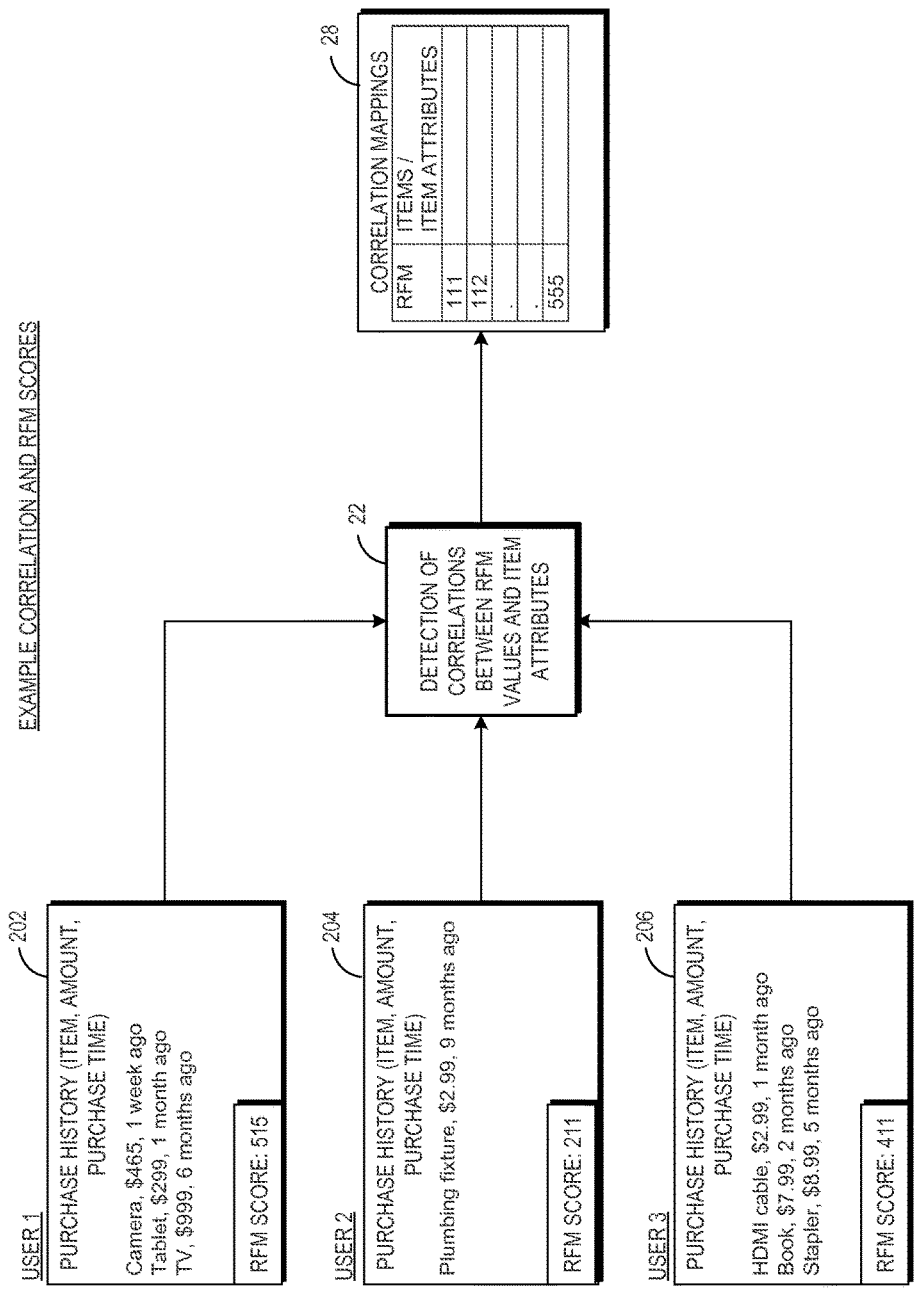
FIG. 2 illustrates a process for using RFM scores to detect correlations between users and catalog items and/or item attributes.

One or more types of recorded events or event histories are analyzed by a correlation detection service 22 to detect behavioral relationships (also called "behavioral associations") between particular items (and/or item attributes) and RFM scores as described more in detail with respect to FIG. 2. The RFM score generator 24 can calculate RFM scores for the users and store the scores in the RFM repository 26. In an embodiment, the RFM scores are calculated every month and updated in the repository 26. In another embodiment, the RFM score for a user can be calculated in real time when the user visits the shopping site or performs a particular type of action. The real time RFM score can be updated in the repository 26. The correlation detection service 22 can use the user specific RFM scores and the purchase histories of users to detect behavioral relationships between the RFM scores and items. (Although the following description refers to the detection of correlations of the RFM scores with "items," the correlations may include or consist of correlations of the RFM scores and particular item attributes or sets of attributes, where an attribute may include, for example, an item category, price, price range, feature, etc.) The correlation detection service 22 can store the correlations between items and RFM scores in a data repository 28.

The RFM-to-item association mappings 28 are used by a recommendation service or engine 50 to provide item recommendations to users. Items may be recommended via many different channels. For example, RFM-to-item association mappings 28 may be used to provide personalized recommendations that are based on a particular user's RFM score. The detected correlations can be used to filter, re-rank, or supplement the recommendations generated by any type of recommendation system or algorithm.

In an embodiment, the detected correlations can be used to filter item-to-item based recommendation as described below. For example, when a user is viewing a "source" item, the recommendation service 30 can select a "target" item based on the source item, the RFM-to-item association mappings 28, and the user's RFM score. The recommendation service 30 may apply an item-to-item filter before using RFM-to-item association mappings 28 filter. As described in U.S. Pat. No. 7,685,074, referenced above, different datasets of item-to-item mappings may be generated based on different types of user behaviors (purchases, item viewing events, etc.), and these datasets may be used in various contexts to provide recommendations to users. The item-to-item associations may be detected using any of a variety of methods that are known in the art, including the methods described in U.S. Pat. Nos. 7,685,074 and 7,827,186, the disclosures of which are hereby incorporated by reference. Accordingly, the recommendation service 30 can use the item-to-item mapping filter and the RFM-to-item mapping filter in conjunction. The recommendation engine 30 can apply the RFM-to-item association 28 on the selected item-to-item associations. In some embodiments, the recommendation engine 20 can reverse the order of filters. The recommendation engine 30 can select a list of items to recommend based on the RFM-to-item association 28 and the narrow down the recommendations based on items-to-items association or other filters. While the combination of filters is described above with respect to item-to-item filter, the RFM-to-item filter can be combined with one or more other filters.

III. RFM-to-Item Correlation Detection

FIG. 2 illustrates example purchase histories for three different users, their corresponding RFM scores and how the correlation engine 22 can generate an RFM-to-item mapping 28 based on the RFM scores. In the illustrated example, the RFM score generator 24 used the RFM subdivision scheme described above to segment the users into one of 125 segments. The 125 segments correspond to combinations of RFM scores according to the scoring scheme described above. For example, 111 represents one segment while 411 represents another segment. In some embodiments, the correlation analysis could alternatively performed in which R, F, and M divisions are considered individually.

Thus, in an embodiment, the RFM score generator calculates a score of 515 for the first user 202. The first user 202 bought an item less than a month ago and is awarded a score of 5 for recency. The first user 202, however, has only had three purchase days in the last two years, which according to the scheme described above would result in a frequency score of 1. Finally, the monetary score for the first user 200 would be 5 because the amount of items purchased exceeds more than $500. The calculated RFM score for the first user 202 can be stored in the user specific RFM data repository 26. The first user's purchase history may be stored in the user specific purchase histories 20. Similarly, the RFM score generator 24 can calculate RFM scores for the second user 204 and the third user 206 and store their scores in the user specific RFM data repository 26.

The correlation detection engine 22 can use the RFM scores and the purchase histories to create an RFM-to-item mapping 28. The correlation detector 22 can identify the purchasing behavior of each segment. In an embodiment, the correlation detector 22 can cycle through all the possible RFM scores, identify all the users with that RFM score, and associate all the purchased items from the identified users with the particular RFM score. Thus, for a 515 segment, the correlation detector 22 can include the $465 camera, $299 tablet, and the $999 television. Similarly, the correlation detector 22 can add the $2.99 plumbing fixture to the 211 segment and add the $2.99 HDMI cable, $7.99 book, and $8.99 stapler to the 411 segment. Accordingly, the correlation detection engine 22 can generate an RFM-to-item mapping 28 from the purchase behaviors of many users.

In some embodiments, the correlation detector 22 searches for statistically significant correlations that differentiate a particular segment from most or all other segments; these "segment characterizing" correlations tend to be the most useful for generating item recommendations. The following are hypothetical examples: (1) users with an RFM score of 551 very rarely purchase jewelry items in comparison to users in other segments; (2) users with RFM scores of 44× (where "x" represents "don't care") purchase audio tracks and audio electronics items significantly more frequently than users in other segments. The first of these correlations may be used to filter out, or to reduce the probability of, recommendations of jewelry items to users having RFM scores of 551. The second may be used to boost, or increase the likelihood of, recommendations of audio tracks and electronic items to users with RFM scores of 44×.

IV. Example RFM Correlation Process

Figure 3:
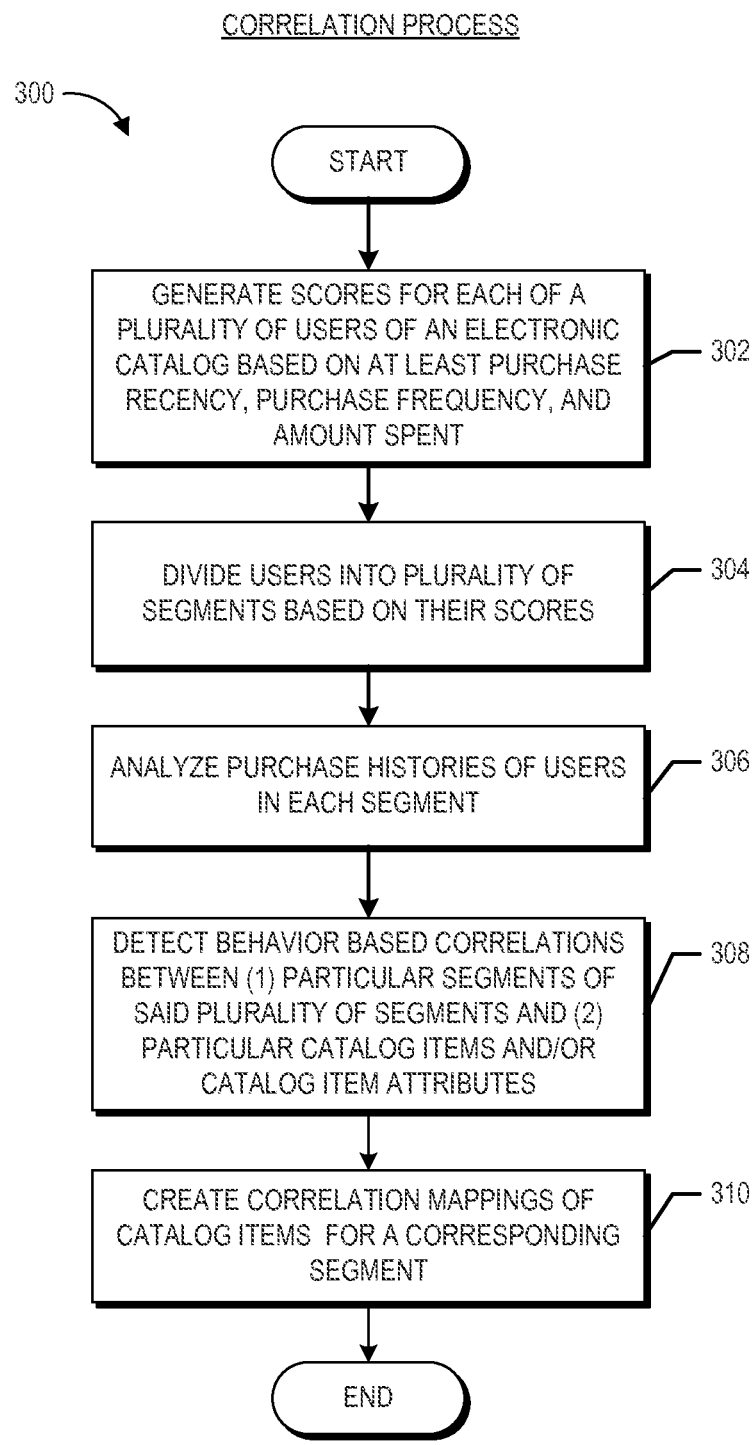
FIG. 3 illustrates an embodiment of a process to detect behavior-based correlations between particular segments and particular catalog items and/or item attributes.

FIG. 3 illustrates an embodiment of a computer process 300 that may be executed periodically to generate RFM-to-item mapping 28. The computer process 300 can be implemented by the system described with respect to FIG. 1. In particular, the process 300 can be implemented by one or more units, modules, or engines (including at least the correlation detection engine 22 and the RFM score generator 24).

In block 302, the RFM score generator 24 generates scores for all or a subset of the users of an electronic catalog (e.g. shopping site). The RFM score generator 24 can also use additional criteria to supplement the RFM scores. For example, the RFM score generator 24 can use tenure of the user with the site to supplement the RFM score. In other embodiments, the users may be scored using only one or two of the RFM parameters (e.g. recency and monetary, just monetary, etc.). The user scores can be stored in the RFM score data repository 26.

In block 304, the users can be divided into multiple segments based on their calculated scores. When using RFM scores according to the scoring scales described above (i.e., a scale of 1 to 5 for each of recency, frequency, and monetary), the users can be divided into one of 125 segments. The users in each segment may share a particular characteristic. Thus, analyzing the purchase behavior for each user in a segment at block 306 may be used to create behavioral associations between users with particular scores and the items they are likely to be interested in purchasing from the electronic catalog. For example, users in the XX1 segment are most likely to be price sensitive and may not purchase high ticket items as compared to the users in the XX5 segment.

The correlation detector engine 22 can detect behavior-based correlations between particular segments and particular catalog items or catalog item attributes at block 308. For example, the correlation detector engine 22 can select a particular segment (e.g. all the users with a score of 515). In some embodiments, the correlation detector engine 22 can group multiple segments for the analysis. The correlation detector engine 22 can use well-known techniques such as label propagation, correlation clustering, etc. to detect the behavior-based correlations. Based on the selected segment, the correlation detector engine 22 can further retrieve all the purchase histories of the users in the selected segment. Correlations are typically detected based on purchase histories of many thousands of users and millions of purchases. Thus, the correlation detector engine 22 may need to retrieve and analyze significant amount of data corresponding to purchase histories. The purchase history can include the items that were purchased, when these items were purchased, the frequency of the items purchased, and the monetary amount of the items purchased. The purchase history of all the users in the selected segment may share some common characteristics because the users in the selected segment also share a common characteristic (e.g. same RFM score).

In an embodiment, the correlation detector engine 22 can search for various types of positive and negative correlations, including correlations with item attributes The item attributes can include many parameters. The correlation detector engine 22 can identify if a particular segment purchases name brand (higher) quality items or generic items more frequently than the general user population. The correlation detector engine 22 can also identify the mean and variance of the price distribution of items purchased for a particular segment. This can indicate price sensitivity and the likelihood of the particular segment purchasing an item worth beyond a certain amount. Using these correlations, the system may attempt to move a particular user up in the segment chain by recommending items that may be at the higher end of price range for that segment, but still within the tolerance. If done gradually, the user may be able to move up in the segmentation hierarchy.

As mentioned above, the correlation detected at block 308 may include negative correlations that represent dislikes of users. For example, users with a RFM score of 111 may rarely buy items in category X. These negative correlations can be used to filter out the rarely purchased items from a preliminary set of recommendations generated for a user with this RFM score. In some embodiments, the correlations may additionally or alternatively be detected based on user behaviors other than purchases. For example, the correlations between RFM scores and items (or item attributes) could additionally or alternatively be based on shopping cart add events, item rating events, wish list add events, item review submissions, and other types of user-generated events that reflect user preferences for particular items or item types.

The correlation detector engine 22 can repeat the above process to identify the correlations for each of the segments. In block 310, the correlation detector engine 22 can store the correlations for each segment in the RFM-to-item mapping 28. In an embodiment, the RFM-to-item mapping data repository 28 can include a list of scores and all the items associated with the respective scores. The RFM-to-item mapping data repository 28 can be updated once a month or at any other appropriate time interval. In other embodiments, the RFM-to-item mapping data repository 28 is updated in real time when there is a need to recommend items. The RFM-to-item mapping data repository 28 can also selectively be updated.

V. Example RFM Recommendation Process

Figure 4:
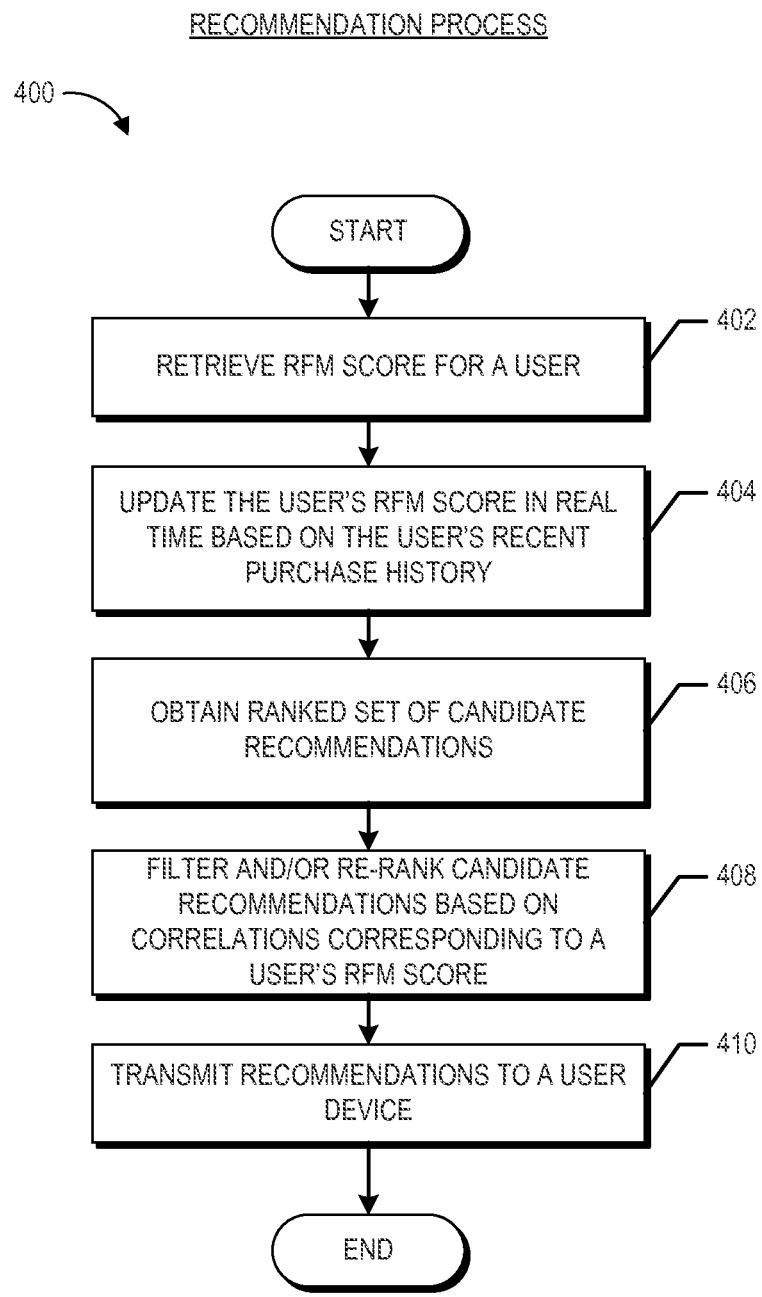
FIG. 4 illustrates an embodiment of a process to generate recommendations using at least the detected correlations.

FIG. 4 illustrates an embodiment of a computer process 400 that can be executed to recommend items to users from an electronic catalog. The computer process 400 can be implemented by the system described with respect to FIG. 1. In particular, the process 400 can be implemented by one or more units, modules, or engines (including at least the recommendation service 30).

In block 402, the recommendation service 30 can retrieve a RFM score for a user from the user specific RFMS data repository 26. In some instances, the recommendation service 30 can update the RFM score in real time based on recent transactions stored in the user specific purchase history data repository 20 at block 404.

In block 406, the recommendation service 30 can obtain a ranked set of candidate recommendations. The ranked set of candidate recommendations can be generated using any recommendation algorithm (e.g. item-to-item associations). In block 408, the recommendation service 30 can subsequently filter or re-rank the set of candidate recommendations based on the correlations corresponding to the user's RFM score. For example, using negative correlations, the recommendation service 30 can remove from the set of candidate recommendations that the user is not likely to purchase. The recommendation engine can transmit the recommendations to a user device at block 410 without further processing.

In some embodiments, if there are no candidate recommendations available, the recommendation service 30 can start with using RFM-to-item mapping 28 to identify candidate catalog items based on the retrieved and/or the calculated RFM score of the user. For example, if the user's RFM score is 411, then the recommendation service 30 can select all the items in the correlation mapping 28 that correspond to the user score of 411. The recommendation service 30 can generate recommendations based on the identified catalog items and may narrow the results using other recommendation algorithms.

In some instances, the recommendation service 30 can also retrieve all browsing session records for some period of time, such as the last day, week or month. In one embodiment, each session record is a record of the browsing activity (including shopping cart add events) of a user over a one-day period, regardless of the number of purchases (if any) made during that period. In other embodiments, the session records may be initiated and closed based on other criteria. For example, the e-commerce system may end a session record when a purchase transaction occurs, and/or may create session records that span multiple days of user activity. Regardless of how session records are initiated and closed, each session record ordinarily corresponds uniquely to a single user or user device. The recommendation service can select items corresponding to the browsing session from the set of items retrieved based on the user's RFM score. For example, a user's browsing record may indicate that the user is interested in buying a tennis racket. The recommendation engine 30 can select tennis rackets from the RFM-to-item mappings that are associated with the user's RFM score. Using the RFM score may prevent the recommendation service 30 from recommending a tennis racket that is significantly out of the price sensitivity of the user.

In some embodiments, the recommendation service 30 can also determine whether a particular correlation is due to the popularity of the item or something that is a result of the segment's RFM characteristic. For example, a book such as Harry Potter may be included in all the segments in the RFM-to-item mapping 28 because users may buy it just for the popularity. Thus, the Harry Potter book may not have strong correlation based on the characteristics of a segment. One way to identify the correlation strength is by comparing how many times an item appears across all the segments. If the item appears in several segments, then that item is less likely to have a strong correlation with any particular segment. If, on the other hand, a given segment has a uniquely strong interest in a particular item or item category relative to other segments, that information may be more useful in generating recommendations. For example, users in the RFM segment of 555 may in particular have a strong preference for SLR cameras compared with any other segment. The recommendation engine 30 can use the strength of correlation to refine recommendations.

In some embodiments, a clustering algorithm may initially be used to subdivide catalog items into clusters of items having similar attributes. Examples of clustering algorithms that may be used for this purpose are described in U.S. Pat. No. 7,966,225, the disclosure of which is hereby incorporated by reference. The recommendation service 30 can select items from the clusters based on the RFM scores and the RFM-to-item mapping 28.

In blocks 406-408, the RFM scores can be used in one or more ways to inhibit low utility recommendations, and/or to generate recommendations. Low-utility recommendations can be inhibited in various ways. One is to filter out, from a dataset of catalog items selected using a criteria (e.g. browsing history) all the items that do not match the user's RFM score. The filtered set of items may then be used to provide recommendations to users.

Another approach is to use the RFM scores to filter and/or rank (or re-rank) the output of a recommendation engine. For example, suppose that a recommendation engine 30 selects items B, C and D to recommend to a user as a result of the user's recent purchase of item A. If item D does not fall in the user's RFM segment, item D may be filtered out so that it is not recommended; or its ranking in the recommendation set may be decreased to reduce its likelihood of being recommended.

Although the embodiments described above focus on user purchase behaviors, any of the features described herein can also be applied to other types of item-selection behaviors of users. For example, rather than (or in addition to) analyzing purchase histories of users, the correlations can be detected based on users' item viewing histories, item download histories, item ratings, shopping cart adds, and/or other types of item selection events that evidence users' affinities for particular items or types of items. For example, by analyzing user-specific item viewing histories in conjunction with users' RFM scores, the correlation detector 22 could detect, e.g., that users with a particular RFM score have a unique interest in portable music players.

Further, any of the features described herein can be used in environments in which the items are selectable but are not available for purchase. For example, in some embodiments the items may be news articles or books that can be selected for (free) viewing. In such embodiments, the "R" score may be based on the user's recency of article viewing, the "F" score may be based on the user's frequency of article viewing, and the "M" score may be omitted. In additional embodiments, the items may be audio (e.g. song) or video (e.g. movies) items, which may be selected for free or through a paid or unpaid subscription.

All of the methods and tasks described above may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a hardware processor (or multiple hardware processors) that includes digital logic circuitry for executing program instructions or modules stored in a memory or other computer-readable storage medium. The various functions disclosed herein may be embodied in such program instructions, although some or all of the disclosed functions may alternatively be implemented in application-specific digital logic circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

For example, the functional components 34, 42, 50 and 52 shown in FIG. 3 may be implemented by a programmed computer system that comprises one or more physical computers or computing devices. Different components 34, 42, 50 and 52 may, but need not, be implemented on or by different physical machines. The various data repositories 32, 40, 44 and 54 shown in FIG. 1 may be implemented as databases, flat files, and/or any other type of computer-based storage system that uses persistent data storage devices to store data. The program logic illustrated in FIG. 1 may be embodied in code that is executed by one or more computing devices of the computer system. The executable code may be stored on one or more non-transitory computer storage devices or media. The system shown in FIG. 3 may also include numerous other components for implementing other features, such as a product search engine, electronic wish lists, electronic shopping carts, product reviews and ratings, etc.

The foregoing embodiments are intended to be non-limiting. Other embodiments, including embodiments that do not provide all of the benefits and features set forth herein, are also within the scope of protection. For example, in some embodiments the cart-add sequences may be used to influence recommendations without the explicit generation of scores. Accordingly, the scope of protection is defined only by reference to the appended claims.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. A computer process for generating behavior-based recommendations, comprising:

generating, by a score generator, scores for individual users of a plurality of users of an electronic catalog that provides functionality for users to browse and purchase catalog items, said scores comprising a first component corresponding to purchase recency, a second component corresponding to purchase frequency, and a third component corresponding to amount spent;

dividing the users into a plurality of segments based on the generated scores, wherein at least some scores correspond to different segments than other scores;

for individual ones of the plurality of users, associating catalog items and/or catalog item attributes from a purchase history of the respective user with a particular segment of the plurality of segments, the particular segment corresponding to the generated score for the respective user;

for individual segments of the plurality of segments, detecting, by a correlation detector, segment characterizing correlations between (1) the respective segment, and (2) particular catalog items and/or catalog item attributes associated with the respective segment, wherein detecting the segment characterizing correlations comprises searching for statistically significant correlations that differentiate particular segments from other segments;

retrieving the generated score for a current user of the plurality of users;

matching the current user's generated score with one of the plurality of segments;

selecting, by a recommendation service, catalog items to recommend to the current user based at least partly on the detected segment characterizing correlations between the matched segment and particular catalog items and/or catalog item attributes; and causing the selected catalog items to be presented to current user via a user interface, thereby enabling the current user to more efficiently locate and navigate to representations of catalog items of interest;

said process implemented programmatically by a computing system that comprises one or more computing devices.

2. The computer process of claim 1, wherein generating the scores further comprises generating for a user, a fourth score based on tenure of the user.

3. The computer process of claim 1, wherein generating the score further comprises generating for a user, a fifth score based on an average rating of the items purchased by the user.

4. The computer process of claim 1, wherein each segment corresponds to a different respective score.

5. The computer process of claim 1, wherein selecting catalog items to recommend comprises using the detected segment characterizing correlations to adjust rankings of catalog items selected by the recommendation service.

6. A system, comprising:

a computer repository that stores purchase histories of a plurality of users;

a computing system comprising one or more computing devices, said computing system programmed to implement:

a score generator that generates scores for individual users of an electronic catalog that provides functionality for users to browse and purchase catalog items, said scores comprising a first component corresponding to purchase recency, a second component corresponding to purchase frequency, and a third component corresponding to amount spent;

a correlation detector that (1) divides a plurality of users into a plurality of segments based on said scores, and (2) detects segment characterizing correlations between particular segments of said plurality of segments, and particular catalog items and/or catalog item attributes based on the purchase histories by searching for statistically significant correlations that differentiate particular segments from other segments, wherein a first of the plurality of segments corresponds to a different respective score or range of scores than a second of the plurality of segments; and a recommendation service that selects catalog items to recommend to particular users based at least partly on the detected segment characterizing correlations, the recommendation service configured to cause the selected catalog items to be presented to the particular user via a user interface.

7. The system of claim 6, wherein the recommendation service is further configured to use the detected segment characterizing correlations to adjust rankings of catalog items selected by a recommendation algorithm.

8. A computer storage system comprising a non-transitory storage device, said computer storage system having stored thereon executable program instructions that direct a computer system to at least:

generate, by a score generator, scores for individual users of a plurality of users of an electronic service that provides functionality for users to browse and select items, said scores comprising a first component corresponding to selection recency, a second component corresponding to selection frequency, and a third component corresponding to amount spent;

divide the users into a plurality of segments based on said scores;

for at least some of the plurality of users, associate items and/or item attributes from an item selection history of the respective user with a particular segment of the plurality of segments, the particular segment corresponding to the generated score for the respective user;

for at least some of the plurality of segments: detect segment characterizing correlations between (1) the respective segment, and (2) particular items and/or item attributes associated with the respective segment, wherein detecting the segment characterizing correlations comprises searching for correlations that differentiate particular segments from other segments;

select, by a recommendation service, items to recommend to particular users based at least partly on the detected segment characterizing correlations; and cause the selected catalog items to be presented to corresponding users via a user interface.

9. The computer storage system of claim 8, wherein selecting items to recommend comprises using the detected segment characterizing correlations to adjust rankings of items selected by the recommendation service.

* * * * *